(12) United States Patent
Shaver et al.

(10) Patent No.: US 6,966,038 B1
(45) Date of Patent: Nov. 15, 2005

(54) SYSTEM AND METHOD FOR IMPROVED NAVIGATION USING BOOKMARKS FOR MOVEMENT BETWEEN LOCATIONS IN A WINDOWS ENVIRONMENT

(75) Inventors: Robert Shaver, Watertown, MA (US); Douglas Walter Conmy, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 09/337,539

(22) Filed: Jun. 22, 1999

Related U.S. Application Data (60) Provisional application No. 60/112,203, filed on Dec. 14, 1998.

(51) Int. Cl.[7] .................................................. G06F 3/00
(52) U.S. Cl. ..................... 715/854; 715/762; 715/835; 715/781; 715/716
(58) Field of Search ................................ 345/854, 738, 345/739; 707/501.1; 709/217; 715/854, 738, 739, 762, 835, 781, 716

(56) References Cited

U.S. PATENT DOCUMENTS

| | | | |
|---|---|---|---|
| 4,813,013 A | 3/1989 | Dunn | 364/900 |
| 5,146,556 A | 9/1992 | Hullot et al. | 395/159 |
| 5,204,947 A | 4/1993 | Bernstein et al. | 395/157 |
| 5,241,655 A | 8/1993 | Mineki et al. | 395/156 |
| 5,297,253 A | 3/1994 | Meisel | 395/160 |
| 5,301,348 A | 4/1994 | Jaaskelainen | 395/800 |
| 5,371,844 A | 12/1994 | Andrew et al. | 395/155 |
| 5,375,200 A | 12/1994 | Dugan et al. | 395/159 |
| 5,404,442 A | 4/1995 | Foster et al. | 395/159 |
| 5,420,976 A | 5/1995 | Schell et al. | 395/159 |
| 5,430,839 A | 7/1995 | Jagannathan et al. | 395/159 |
| 5,463,726 A | 10/1995 | Price | 395/155 |
| 5,463,727 A | 10/1995 | Wiggins et al. | 395/156 |
| 5,469,540 A | 11/1995 | Powers, III et al. | 395/158 |
| 5,497,455 A | 3/1996 | Suga et al. | 395/159 |
| 5,500,936 A | 3/1996 | Allen et al. | 395/156 |
| 5,506,952 A | 4/1996 | Choy et al. | 395/159 |
| 5,530,796 A | 6/1996 | Wang | 395/156 |
| 5,555,370 A | 9/1996 | Li et al. | 395/161 |
| 5,588,105 A | 12/1996 | Foster et al. | 395/326 |
| 5,594,857 A | 1/1997 | King et al. | 395/352 |
| 5,600,779 A | 2/1997 | Palmer et al. | 395/340 |
| 5,602,981 A | 2/1997 | Hargrove | 395/352 |
| 5,617,526 A | 4/1997 | Oran et al. | 395/326 |
| 5,621,880 A | * 4/1997 | Johnson | 345/700 |
| 5,623,589 A | 4/1997 | Needham et al. | 395/160 |
| 5,644,737 A | 7/1997 | Tuniman et al. | 395/352 |
| 5,657,049 A | 8/1997 | Ludolph et al. | 345/145 |
| 5,708,787 A | 1/1998 | Nakano et al. | 395/352 |
| 5,731,813 A | 3/1998 | O'Rourke et al. | 345/349 |
| 5,734,380 A | 3/1998 | Adams et al. | 345/340 |
| 5,745,109 A | 4/1998 | Nakano et al. | 345/340 |
| 5,748,927 A | 5/1998 | Stein et al. | 395/333 |
| 5,757,371 A | 5/1998 | Oran et al. | 345/348 |

(Continued)

*Primary Examiner*—Heather R. Herndon
*Assistant Examiner*—Mylinh Tran
(74) *Attorney, Agent, or Firm*—Pillsbury Winthrop Shaw Pittman LLP (57) ABSTRACT

A system and method for providing a bookmark section within each program GUI. The bookmark section contains one or more selectable portions that enable a user to select one or more bookmarks corresponding to programs, files within programs, views within programs or files, or any other graphical presentation that is accessible within the system. The user selects a bookmark and proceeds directly to the desired location in the system corresponding to that bookmark with a single step. The user may create bookmarks so that locations within the system may be quickly accessed.

30 Claims, 7 Drawing Sheets

U.S. PATENT DOCUMENTS

| | | | |
|---|---|---|---|
| 5,796,404 A | 8/1998 | Gentner | 345/352 |
| 5,815,152 A | 9/1998 | Collier et al. | 395/348 |
| 5,825,357 A | 10/1998 | Malamud et al. | 345/340 |
| 5,841,435 A | 11/1998 | Dauerer et al. | 345/339 |
| 5,854,630 A | 12/1998 | Nielsen | 345/352 |
| 5,864,815 A | 1/1999 | Rozak et al. | 704/275 |
| 6,028,600 A * | 2/2000 | Rosin et al. | 345/327 |
| 6,069,628 A | 5/2000 | Farry et al. | 345/348 |
| 6,072,485 A | 6/2000 | Barnes et al. | 345/339 |
| 6,147,684 A | 11/2000 | Nielsen et al. | 345/344 |
| 6,184,886 B1 * | 2/2001 | Bates et al. | 345/357 |
| 6,246,406 B1 | 6/2001 | Nielsen et al. | 345/340 |

* cited by examiner

SYSTEM AND METHOD FOR IMPROVED NAVIGATION USING BOOKMARKS FOR MOVEMENT BETWEEN LOCATIONS IN A WINDOWS ENVIRONMENT

RELATED APPLICATIONS

This application claims priority based on U.S. Provisional Patent Application Ser. No. 60/112,203, entitled "System and Method For Improved Navigation In a Windowing Environment With Window Tabs and Bookmarks," filed Dec. 15, 1998. This application is also related to U.S. Pat. No. 6,489,975, entitled, "System and Method for Improved Navigation Between Open Windows In An Application Program Using Window Tabs," which issued Dec. 3, 2002.

FIELD OF THE INVENTION

The invention relates to a system and method for presenting a graphical user interface that improves navigation within a computer system by using bookmarks to enable the user to move to any location within the computer system.

BACKGROUND OF THE INVENTION

Graphical user interfaces (GUI) enable users to navigate among various options, programs, and features available by a system and have become a standard feature for computer systems. Some systems may enable a user to open and operate multiple different programs simultaneously, with each program having a GUI that enables users to select features and functions in that program. In order to move between multiple open programs GUI's, an operating system GUI may be provided that has a task bar containing icons that may be selected to activate a different open program. A different icon may be presented in the task bar for each program that is opened by the system. Additional icons may also be presented in the task bar.

These systems do not provide a mechanism within a GUI for easily opening other programs or files within particular programs. To open a program, these systems require the user to either (1) utilize a start menu and enter the name of the program or file to be opened (which requires the user to remember the name of the file for the program or browse through a number of files) or (2) minimize all currently displayed program GUIs to reveal a desktop on which various icons may be presented that, when selected, open a particular program that is available on the system. To open a file within a particular program, a user repeats these steps, opens the desired program GUI, and then, after the desired program GUI has been opened, the user proceeds with various steps within that program to open a desired file.

For example, if a user has a word processing GUI opened and desires to read a particular electronic mail message, the user must first open an electronic mail program and then open the desired message within that program. If the electronic mail program is already active, the user must still select the icon from the task bar for the electronic mail program and then open the desired file. This requires performing several steps for each action.

Other current systems may present a plurality of available programs superimposed within a program window. For example, a plurality of selectable icons may be presented near the top of the program GUI. The user may open one of these programs by selecting the icon presented at the top. To open a particular file within that program, the user must still open the program from one of the superimposed icons and then open the file within the program.

Further, within each program a user may open multiple files or have multiple windows opened at the same time within that program's GUI. To navigate between various open windows, the program GUI may provide a menu bar with pull-down menus that provide a variety of selectable functions. One of the pull-down menus may comprise a listing of the opened windows within the program. The user may thereby activate a different window by selecting from the list of windows presented in the pull-down menu.

Some current systems also permit the user to have multiple windows presented within a program GUI window at the same time. The user may select the size of each window and may have the windows tiled or cascaded, for example. Additionally, some systems enable a user to minimize each window within a program window. Accordingly, multiple icons corresponding to each opened window within a program window may be presented within the program window. The user may then select the window to be maximized by selecting the icon corresponding to the program window. These current systems therefore do not provide an easy way to move between open windows within a program GUI.

Other drawbacks also exist with existing systems.

SUMMARY OF THE INVENTION

Accordingly, it is an object of the present invention to overcome these and other drawbacks of current systems.

One object of the present invention is to provide a system, method, and computer readable medium that facilitates navigation to any portion of a computer system.

Another object of the present invention is to provide a system, method, and computer readable medium that enables a user to quickly access any portion of a computer system through the use of bookmarks.

According to another embodiment of the present invention, a system and method are provided for providing a bookmark section within each program GUI. The bookmark section may contain one or more selectable portions that enable a user to select one or more bookmarks corresponding to programs, files within programs, views within programs or files, or any other graphical presentation that is accessible within the system. The user may thereby simply select a bookmark and proceed directly to the desired location in the system corresponding to that bookmark with a single step. Further, the user may create bookmarks so that locations within the system may be quickly accessed. For example, if a particular word processing file within a word processing program is frequently updated, the user may desire to bookmark the file so that the user can open that file by simply selecting the corresponding bookmark.

This system may be realized by the provision of a plurality of modules including a bookmark selection module that enables a user to select a bookmark presented in the GUI. A bookmark execution module responds to the bookmark selection module to present the location corresponding to the selected bookmark. A bookmark database is provided that contains entries for each bookmark on the system, each entry containing an identification of the bookmark and the link associated with that bookmark. A bookmark creation module enables a user to create a bookmark to a location within the computer system. The bookmark presentation module responds by presenting the bookmark button that has been created.

Other objects, features and advantages of the present invention will be apparent from reviewing the detailed description and drawings of the present invention set forth herein.

DETAILED DESCRIPTION OF THE PRESENT INVENTION

Figure 1:
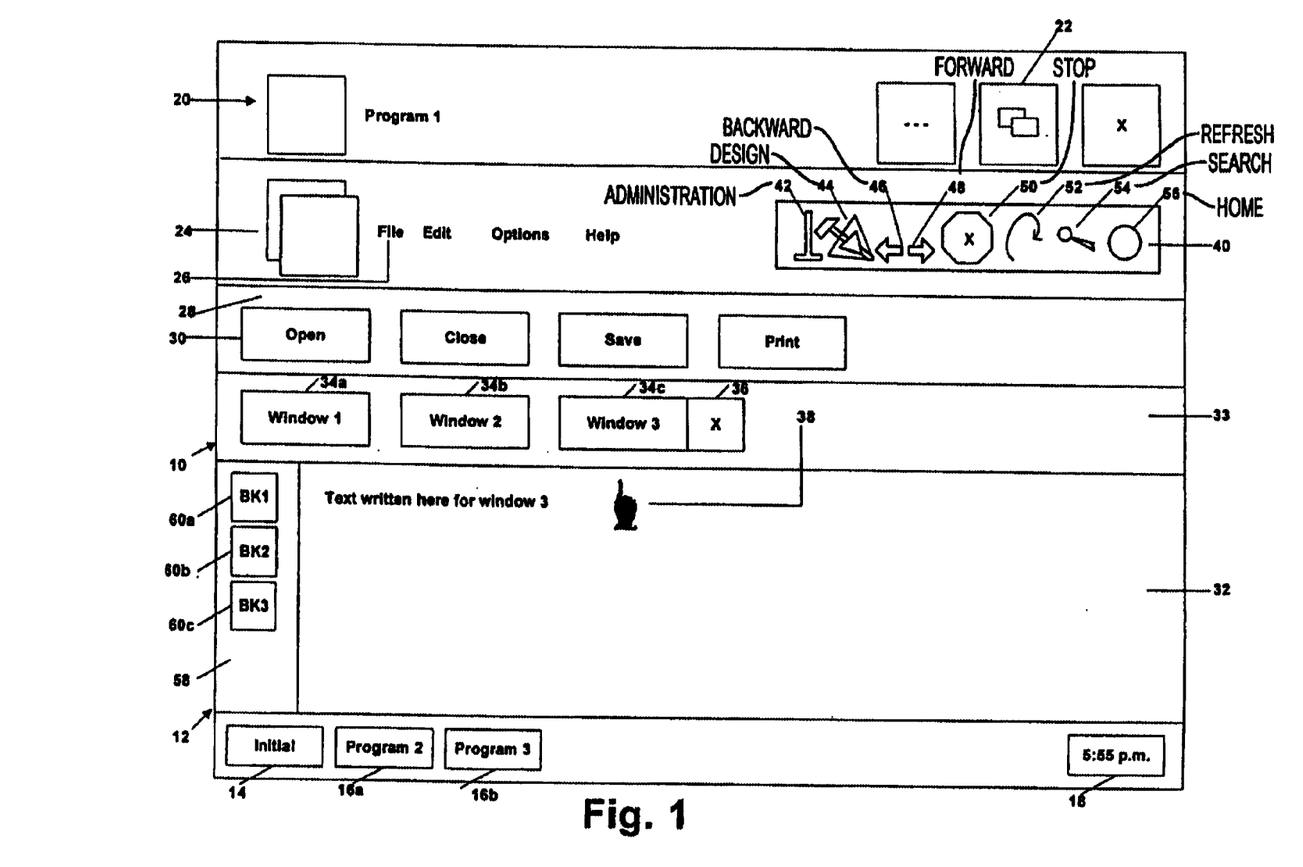
FIG. 1 is an example of a program GUI according to an embodiment of the present invention.

According to one embodiment of the present invention, a system, method and computer readable medium is provided for facilitating navigation within a computer system. FIG. 1 depicts one embodiment of a system GUI 10 according to one embodiment of the present invention. GUI 10 may comprise several features for improved navigation including a window bar 33 with one or more window selection displays 34 and one or more bookmark buttons 60.

Specifically, a window bar 33 may comprise one or more window selection displays 34, each of which may correspond to an open window within GUI 10. In one example, a window selection display 34 may be presented within window bar 33 for each window opened within GUI 10.

Window selection display 34 may be selectable by a user through any known mechanism for selecting portions within a GUI, including a mouse, keyboard, touch screen, voice response, computer pen, motion detector or any other like mechanism.

According to one embodiment, only one window may be active within GUI 10. The active window may comprise the window in which editing may be performed or from which information may be printed, for example. According to this embodiment, by selecting a window selection display 34, the window corresponding to that window selection display 34 may become active.

Figure 2:
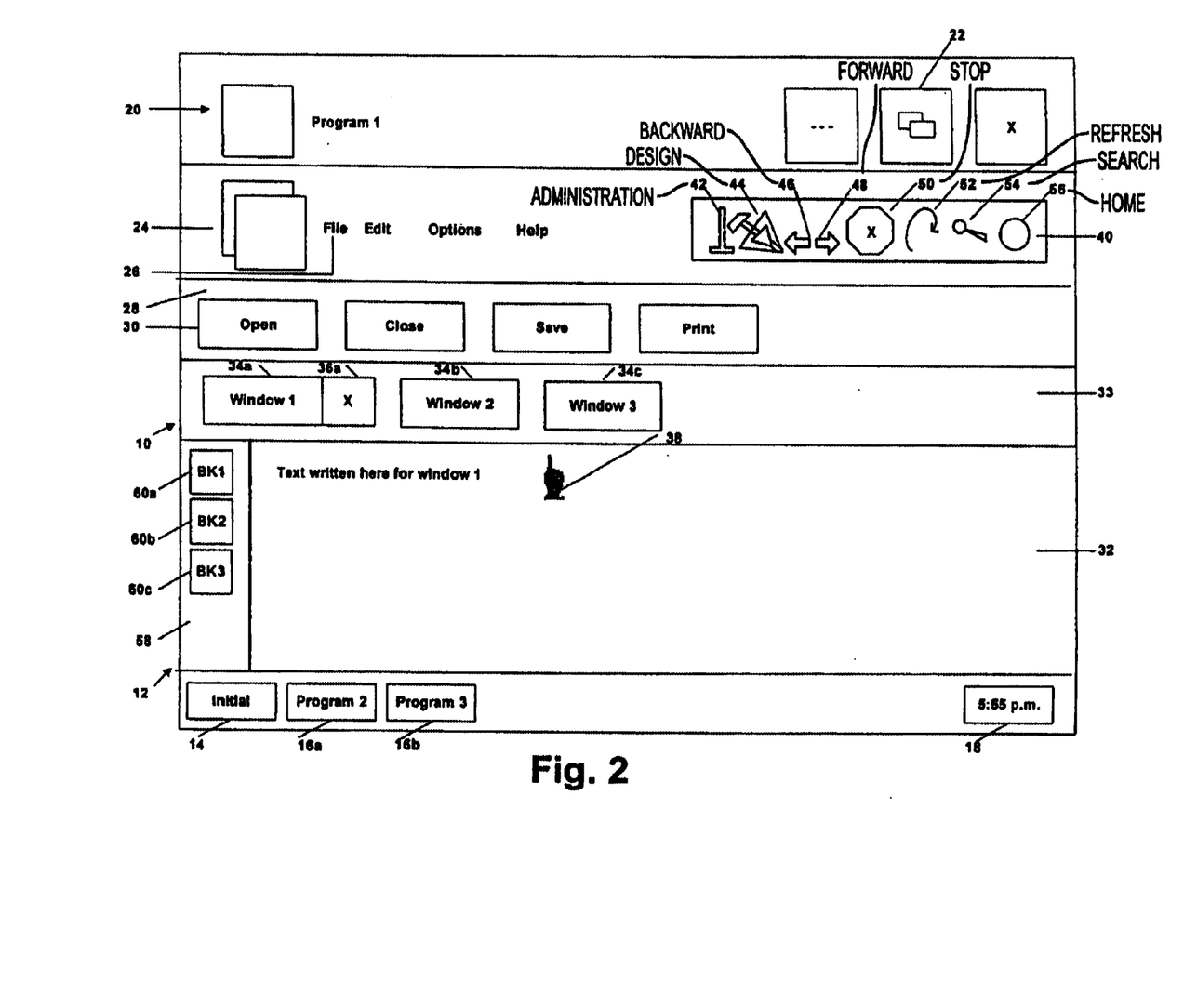
FIG. 2 is another example of a program GUI according to an embodiment of the present invention.

GUI 10 may also comprise an opened window area 32, as shown in the embodiment of FIG. 1, in which an opened window may be displayed. Selection of a window selection display 34 may cause the window corresponding thereto to be presented within opened window area 32. Accordingly, a user may navigate between a plurality of opened windows within GUI 10 by selecting the window selection display 34 corresponding to the desired window. For example, by selecting window selection display 34a, as depicted in FIG. 1, Window 1 corresponding to window selection display 34a may be presented in opened window area 32, as depicted in FIG. 2.

According to one embodiment of the present invention, window selection display 34 corresponding to the window presented in opened window area 32 may be displayed differently than the other window selection displays 34. Any method for distinguishing between display portions of a GUI may be used including colors, size, shape, tinting, flashing, rotating, scrolling, lining, highlighting, or any other method. Further, the window selection display 34 corresponding to the opened window may comprise a kill box 36 associated therewith. By selecting kill box 36, the window with which it corresponds may be closed. For example, kill box 36 may be selected by moving pointer 38 over the kill box and activating pointer 38 through an external device, such as a keyboard or mouse. Similarly, pointer 38 may be used to select window selection displays 34.

According to another embodiment, kill box 36 may be presented with a window selection display 34 when pointer 38 is moved near or over that window selection display 34. Accordingly, even if a window is not presented in opened window area 32, the user may close that window by moving pointer 38 over the window selection display 34 corresponding to that window and selecting kill box 36 presented for that window.

According to another embodiment of the present invention, multiple window selection displays 34 may have kill boxes 36 presented therewith within GUI 10. Also, all of the window selection displays 34 may have kill boxes 36.

Further, to assist in navigating, GUI 10 may also comprise a navigation bar 40 comprising, for example, one or more of the following navigation buttons: an administration button 42, a designer module initiation button 44, a backward button 46, a forward button 48, a stop button 50, a refresh button 52, a search button 54 and a home button 56. Operation of these buttons may be according to known methods of using such buttons. Additional uses of these buttons is described in greater detail below. Further, administration button 42 may also be implemented as a bookmark, as those bookmarks are described below.

Forward and backward navigation buttons 46 and 48 may also be used to navigate between windows within opened window area 32. Selecting backward navigation button 46 presents each window opened in reverse order. Similarly, selecting forward navigation button 48 presents each opened window in the order it was presented. Forward and backward navigation buttons 46 and 48 may also be selected successively to present each window that was previously active until the final or original window is presented. Other navigation buttons may also be used.

According to another embodiment of the present invention, GUI 10 may also comprise a bookmark bar 58. Bookmark bar 58 may comprise one or more bookmark buttons 60. According to this embodiment, bookmark buttons 60 may comprise selectable graphical presentations that contain a presentation area containing graphics depicting what bookmark button 60 represents. According to one embodiment of the present invention, bookmark buttons 60 may correspond to a link to a portion of a system. The links may refer to a program, view, page, file within a program, view within a file within a program, action, or any other linkable portion of a computer system. Accordingly, the user may be able to open a view within a file within a program by selecting bookmark button 60 in GUI 10. By enabling a user to create bookmarks to anything within the system, navigation within the system is vastly improved. Bookmark buttons 60 may be replaced with any other user selectable mechanism within a GUI, such as a pull-down menu or the like. Further, bookmark buttons 60 may be created in bookmark folders which allow the user to organize the bookmarks. Accordingly, a depiction of the folder may appear within bookmark bar 58. The user may then activate a bookmark button 60 by selecting the folder and then selecting the bookmark button or other selectable portion depicted within the bookmark folder.

GUI 10 may also comprise other features. Specifically, GUI 10 may comprise a task bar 12 comprising one or more icons for selecting open programs in system 10. Task bar 12 may comprise an initiation icon 14, a plurality of opened program icons 16 and a time icon 18. Task bar 12 may operate according to known methods of operation of task bars.

GUI 10 may also comprise a program header 20 which has one or more window control icons 22 within that header. Program header 20 may display the name of the program that is operating on the system. GUI 10 may also comprise a file menu bar 24 comprising one or more file names 26. Each file name 26 may represent a pull-down menu according to known methods.

GUI 10 may also comprise a toolbar 28 having one or more tool icons 30. Tool icons 30 may be selected by a user to perform one or more functions within the program displayed in GUI 10. Specifically, GUI 10 may comprise a task bar 12 comprising one or more icons for selecting open programs in system 10. Task bar 12 may comprise an initiation icon 14, a plurality of opened program icons 16 and a time icon 18. Task bar 12 may operate according to known methods of operation of task bars.

GUI 10 may also comprise a program header 20 which has one or more window control icons 22 within that header. Program header 20 may display the name of the program that is operating on the system. GUI 10 may also comprise a file menu bar 24 comprising one or more file names 26. Each file name 26 may represent a pull-down menu according to known methods.

GUI 10 may also comprise a toolbar 28 having one or more tool icons 30. Tool icons 30 may be selected by a user to perform one or more functions within the program displayed in GUI 10.

Figure 3:
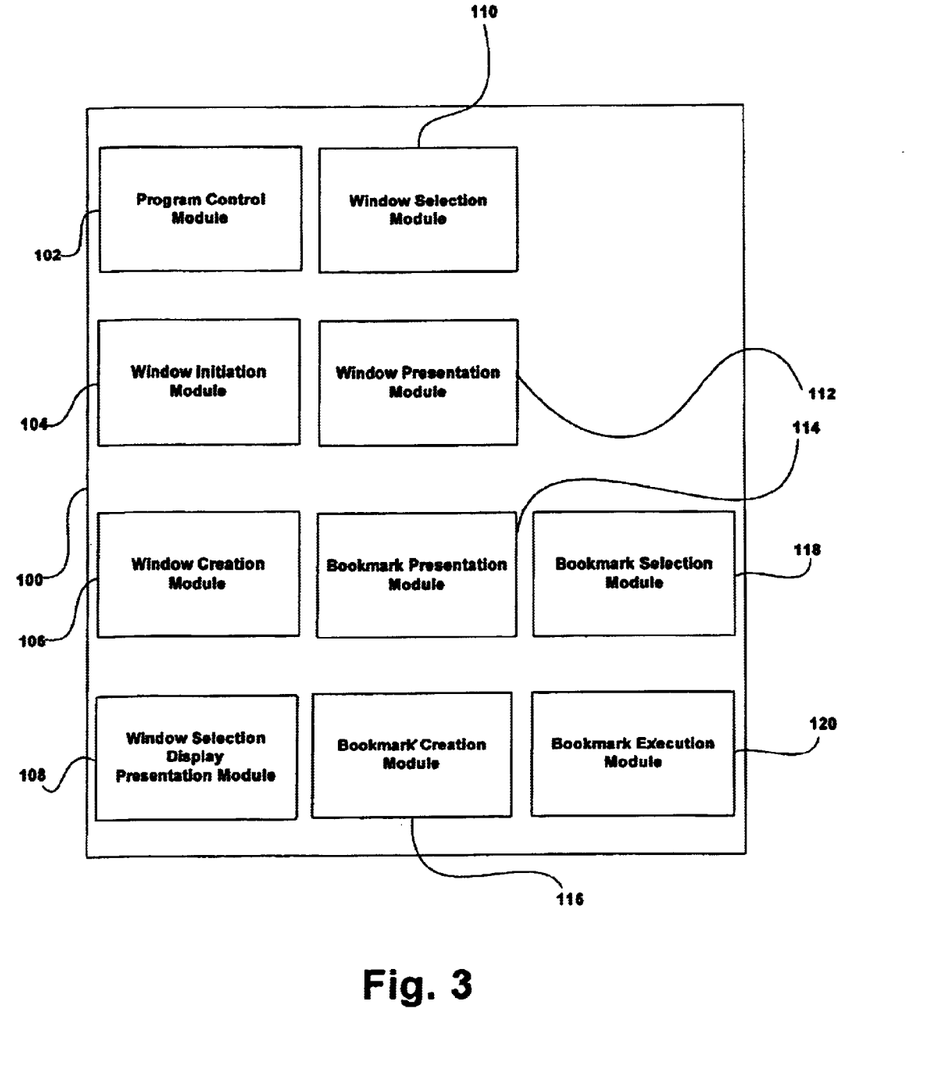
FIG. 3 depicts a block diagram of a system according to an embodiment of the present invention.

According to one embodiment of the present invention, a system 100, as shown in FIG. 3, may be provided for realizing the features described above. System 100 may comprise, for example, one or more of the following modules: program control module 102, window initiation module 104, window creation module 106, window selection display presentation module 108, window selection module 110, window presentation module 112, bookmark presentation module 114, bookmark creation module 116, bookmark selection module 118, and bookmark execution module 120.

System 100 may comprise a portion of a personal computer, a network computer, a notebook computer, a portable electronic device, a mainframe computer system or any other computer system. It should also be understood that although several modules in FIG. 3 are depicted as being within system 100, such modules may also be part of a different system as well.

According to one embodiment, program control module 102 may control one or more programs within system 100 and presenting GUIs, such as GUI 10. GUI 10 may therefore be controlled by program control module 102. Window initiation module 104 may receive instructions to create a new window within GUI 10 through a menu, selection of a task bar button, selection of a tool bar button, or some other mechanism, for example. Window initiation module 104 may cooperate with an external device permitting a user to utilize one of these initiation mechanisms.

Window creation module 106 may respond to an initiation instruction through window initiation module 104. Window creation module 106 opens a new window and presenting that window within GUI 10 and also creates a new window selection display 34 corresponding to the new window. The correspondence between the window selection display 34 and the window may be stored in a database so that when window selection display 34 is selected, the corresponding window may be activated and/or presented.

Window selection display presentation module 108 may be responsible for displaying the window selection displays 34 in GUI 10. Window selection display presentation module 108 may also be responsible for presenting the window selection displays 34 in such a way to distinguish between window selection display 34 corresponding to the active or presented window and other window selection displays 34.

Window selection module 110 may be responsible for receiving selection of window selection displays 34. Window selection module 110 may cooperate with an external mechanism that enables a user to select a graphical display within a GUI, such as a mouse, keyboard, etc. Upon selection of window selection display 34, window selection module 110 may call window presentation module 112 and window selection display presentation module 108 to present the selected window and modify the display of the window selection displays 34 within GUI 10. Window presentation module 112 may present a window within opened window area 32 of GUI 10.

Figure 4:
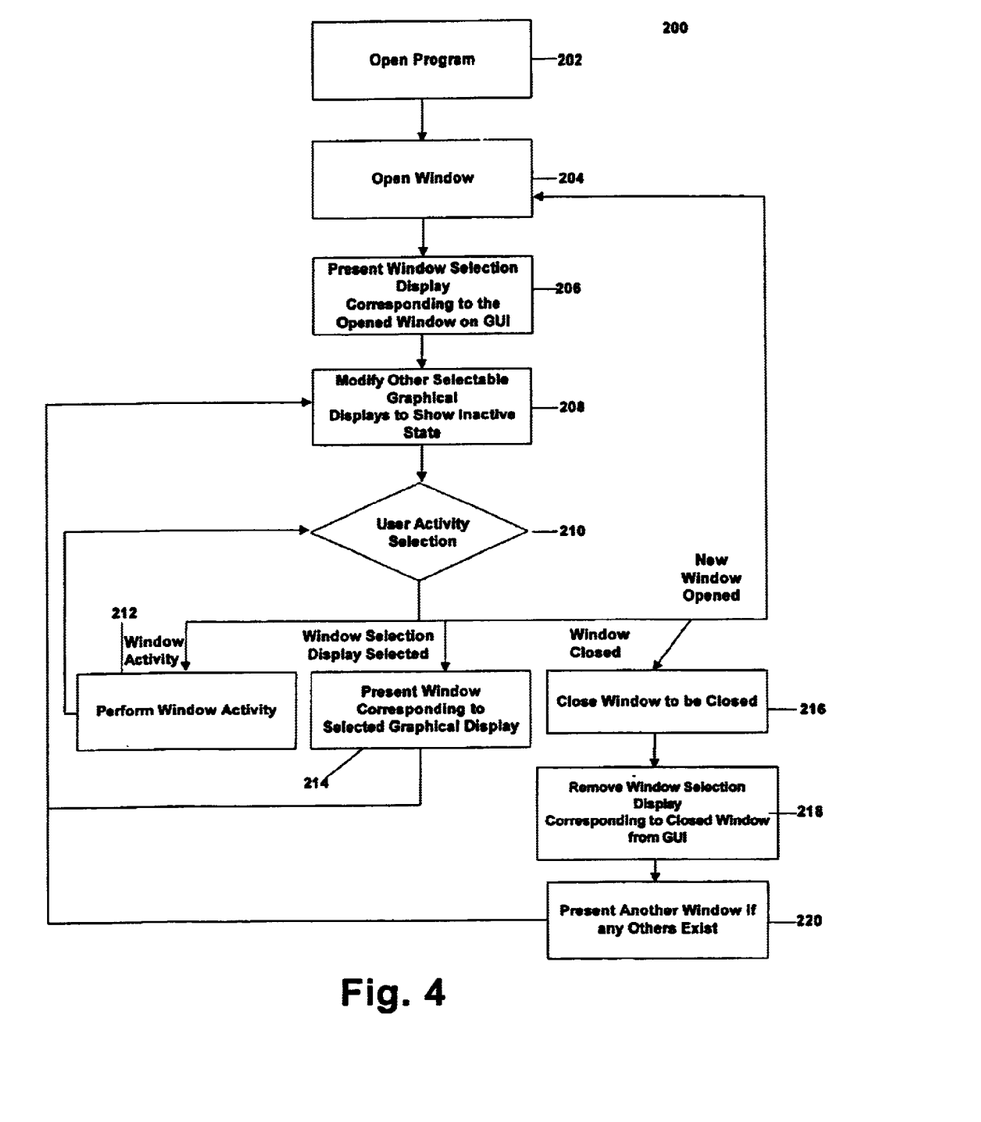
FIG. 4 depicts a flow diagram of a method of operation of selectable graphical displays for windows according to an embodiment of the present invention.

Operation of modules 102–112 may be understood in greater detail as described below with respect to FIG. 4. FIG. 4 is a block diagram of a method 200 according to one embodiment of the present invention. In step 202, a program is opened by program control module 102. A user may then open a window in step 204 through program control module 102, window initiation module 104, and window creation module 106. When a window is opened, in step 206, a window selection display 34 may be presented in GUI 10 by window selection display presentation module 108. Next, in step 208, if other window selection displays 34 are present in GUI 10, those window selection displays 34 may be modified to be distinguishable from window selection display 34 corresponding to the now-opened window. Window selection display presentation module 108 may perform this function.

Then, in step 210, system 100 waits for one of several activities by the user. If the user performs one of a plurality of window activities, step 212 allows the window activity to be performed and returns to step 210. Window activities may comprise any activity that may be performed with respect to an open window within a program. The activity may comprise editing, modifying, displaying, printing, sizing, shifting, highlighting, etc.

If, in step 210, the system receives a user selection of a window selection display 34 through window selection module 110, the system presents the window corresponding to that window selection display 34 in step 214. Window presentation module 112 may be responsible for presenting the correct window. After step 214, the system may also perform step 208, as described above, to correctly display the current windows.

If, in step 210, the system receives an instruction to close a window, then in step 216, the window that was requested to be closed is closed by window presentation module 112. Then, in step 218, the window selection display 34 corresponding to the closed window is also removed from GUI 10 by window selection display presentation module 108. Then, in step 220, if another window is still open within the program, then another window is presented in opened window area 32 by window presentation module 112. According to one embodiment, the window selected may be the last opened window, the previously displayed window, or a random window. Any method for selection between a plurality of windows may be used to determine the window to present. The system then performs step 208.

If, in step 210, a user desires to open a new window, then steps 204, 206, and 208 may be performed, as described above. This cycle may continue until, in step 210, the user decides to close the program or exit the system, for example.

According to another embodiment of the present invention, system 100 may also present bookmarks in GUI 10. Accordingly, bookmark presentation module 114 may be provided to present bookmarks within GUI 10. Predetermined bookmarks may be provided by the system. For example, bookmarks for a home page within the program, a mail program, a headlines page, an electronic calendar program, an address book program, a "to-do" list, a database replication program, "favorites" of the user, databases, creating a new file, an Internet browser, etc., may be provided by the program. Additionally, bookmarks for pages available on the World Wide Web or other Internet location may also be provided. For example, bookmarks stored in a browser application may also be displayed within these bookmarks.

Bookmarks may comprise links to any file, view, or page within the computer system including a view from a program operating on the computer system, execution of a program on the computer system, a file on a server to which the computer system is connected, and even multiple locations to retrieve multiple files. The bookmark may also comprise a link to content outside the computer system, such as information accessible through a packet-switched network such as the Internet and the World Wide Web.

Some or all of these predetermined bookmarks may be presented by bookmark presentation module 114. As depicted in FIG. 1, bookmark presentation module 114 may present bookmark buttons 60 along one side of opened window area 32 or in any other location.

Bookmark presentation module 114 may present a graphical display within bookmark button 60 that indicates what the bookmark represents. For example, a house may be depicted for a home page, a newspaper may be depicted for a subscription, and a calendar may be depicted for a calendar program. Bookmark buttons 60 may also be presented with words to indicate what the bookmark represents. Additionally, various levels of bookmarks may be provided by bookmark presentation module 114.

Specifically, a button may be selected and then bookmark presentation module 114 may present additional selections. The additional selections may be in the form of a menu, a pull-down screen or a pop-up listing of additional buttons that may be selected or other mode of selection. Multiple levels of additional selections may also be provided by bookmark presentation module 114.

A bookmark creation module 116 may also be provided that enables a user to create a bookmark. Bookmark creation module 116 may create a bookmark database 300, as, for example, depicted in FIG. 5. For each bookmark created, bookmark database 300 may comprise a bookmark name entry 302, a program entry 304, and an operations entry 306. Program entry 304 may contain linking information, such as the name of the program. Operations entry 306 may contain additional linking information, such as the location within a program that the bookmark represents, such as a desired view, file, or other portion of the system. Other database formats may also be used for storing the links that correspond to bookmark button 60 presented in the GUI 10.

A bookmark selection module 118 may also be provided. Bookmark selection module 118 enables a user to select a bookmark button 60 presented in GUI 10. Bookmark selection module 118 may cooperate with an external device that enables selection of a display within a GUI.

Figure 5:
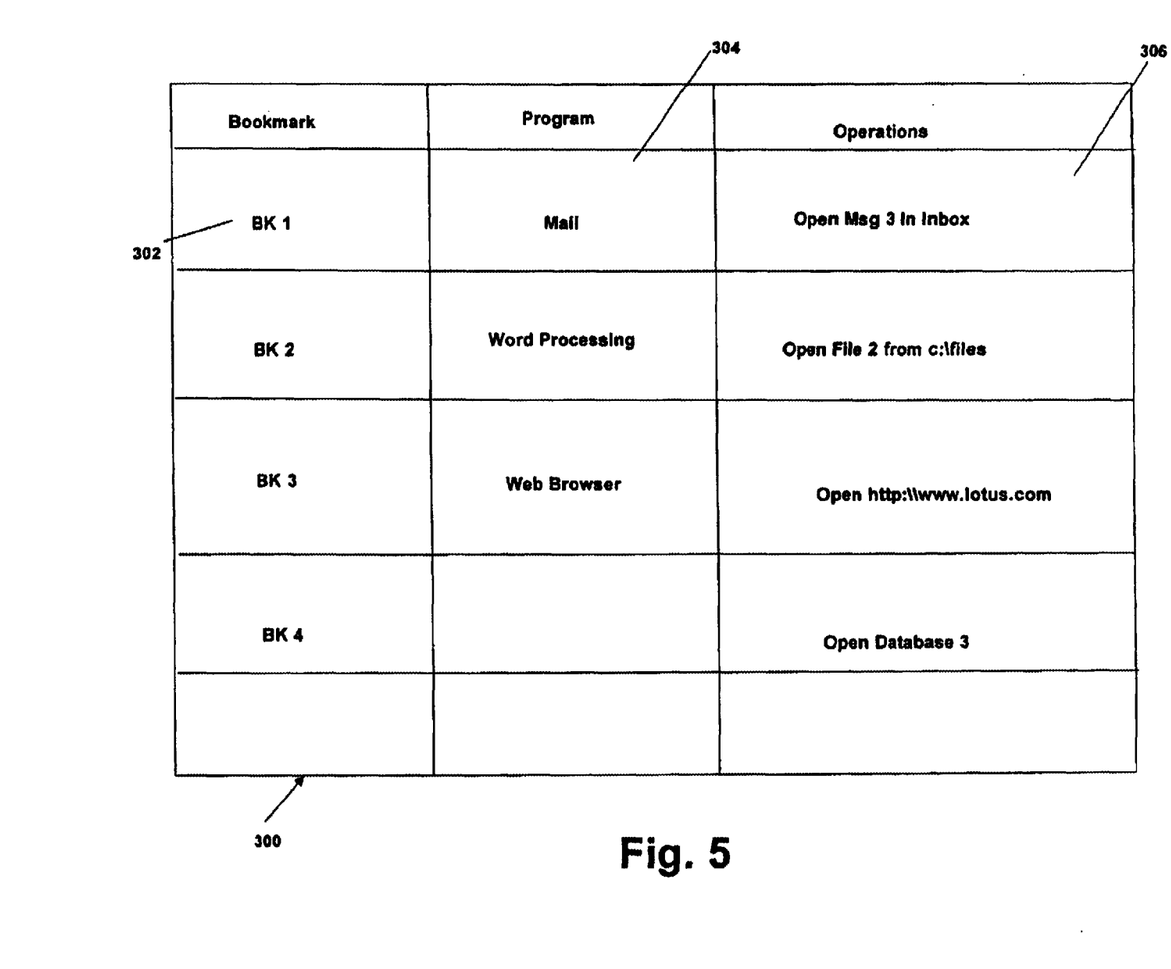
FIG. 5 depicts a bookmark database according to an embodiment of the present invention.

Further, a bookmark execution module 120 may be provided that responds to bookmark creation module 116 and interfaces with bookmark database 300 to determine the link corresponding to the bookmark selected. Bookmark execution module 120 then opens the program identified in the link and performs the operations necessary to present the view, page, file or other portion identified for this bookmark.

Figure 6:
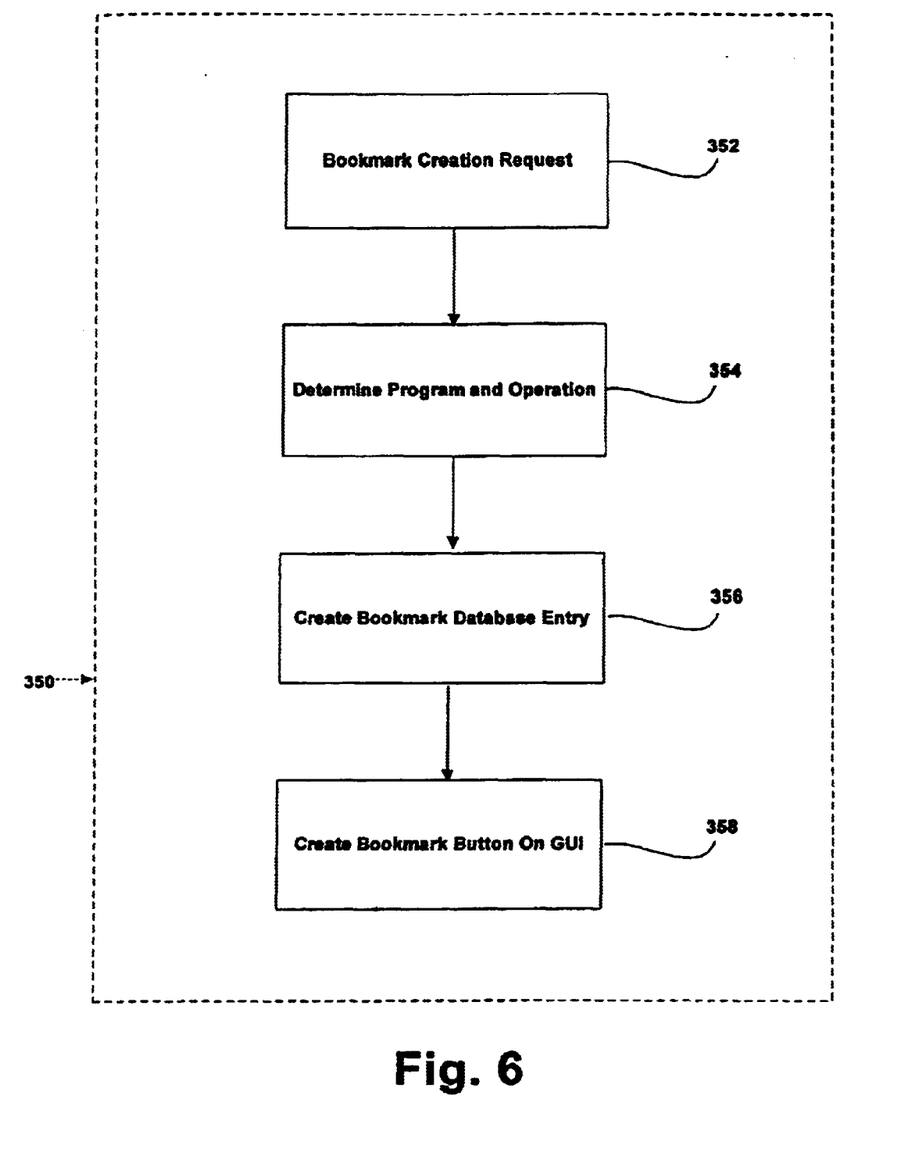
FIG. 6 depicts a method of creating a bookmark according to an embodiment of the present invention.

A method 350 of creating a bookmark is described with respect to FIG. 6. In step 352, a bookmark creation request is received through bookmark creation module 116. The request may be generated within any view, window, or portion of GUI 10 of a program operation on system 100. In step 354, bookmark creation module 116 determines the program in which the request was generated. For example, if the user desires to bookmark a view within a word processing program, then the word processing program in which the bookmark is initiated is identified by bookmark creation module 116. Also in step 354, bookmark creation module 116 determines any additional information that is to be stored in bookmark database 300 for this link. For example, the file name, view, database, or other portion within the system that is being bookmarked may be identified. For example, FIG. 5 depicts information that may be stored for a bookmark link including a message name, as in the first row, a file name as in the second row, a web address as in the third row, or a database name as in the fourth row. Other link information may also be identified and stored within bookmark database 300.

In step 356, the information collected in step 354 may be used to create an entry for the new bookmark in bookmark database 300. Step 354 may be performed by bookmark creation module 116. Then, in step 358, a bookmark button 60 may be created in GUI 10. Step 358 may be performed by bookmark creation module 116 and bookmark selection module 118. Other mechanisms for enabling a user to select a bookmark button 60 may also be provided.

Figure 7:
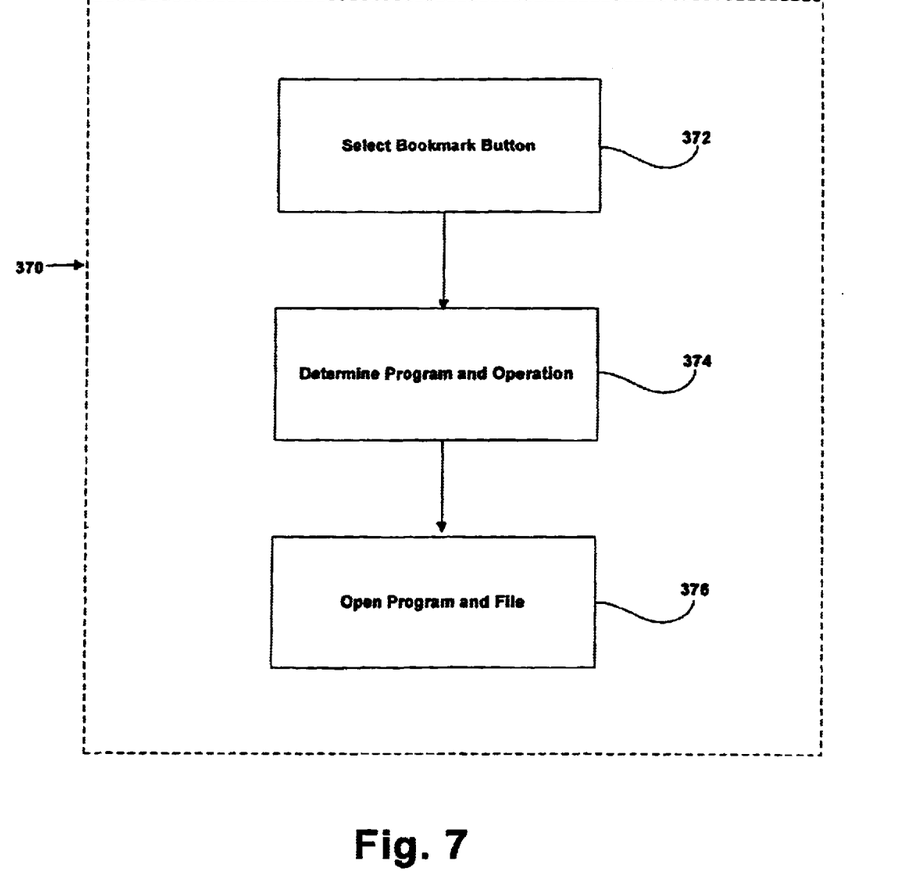
FIG. 7 depicts a method of selecting a bookmark according to an embodiment of the present invention.

FIG. 7 depicts a method 370 for opening a bookmark by a user according to one embodiment of the present invention. According to this method, in step 372, a user may select bookmark button 60 through bookmark selection module 118. In step 374, bookmark button 60 may be used to determine the program and other operation information associated with the selected bookmark button 60 by using bookmark database 300. Step 374 may be performed by bookmark execution module 120. Then, in step 376, the program and other operations stored for this bookmark may be performed by bookmark execution module 120. Specifically, bookmark execution module 120 may open a program, a file within a program or a view within a program, for example. Bookmark execution module 120 may open any location within system 100.

According to another embodiment of the present invention, a computer usable medium having computer readable program code embodied therein for presenting table information in portions may be provided. For example, the computer usable medium may comprise a CD ROM, a floppy disk, a hard disk, or any other computer usable medium. One or more of the modules of system 100 may comprise computer readable program code that is provided on the computer usable medium such that when the computer usable medium is installed on a computer system, those modules cause the computer system to perform the functions described.

According to one embodiment, program control module 102, window initiation module 104, window creation module 106, window selection display presentation module 108, window selection module 110, window presentation module 112, bookmark presentation module 114, bookmark creation module 116, bookmark selection module 118, and bookmark execution module 120 may comprise computer readable code that, when installed on a computer, perform the functions described above. Also, only some of the modules may be provided in computer readable code.

According to one specific embodiment of the present invention, system 1100 may comprise components of a software system licensed by the Lotus Development Corporation under the names Lotus Notes™ and Lotus Domino Designer™. System 100 may operate on a network and may be connected to other systems 100 sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system for enabling a user to navigate within a computer system through the use of bookmarks comprising:
   a bookmark presentation module that presents one or more bookmarks in a graphical user interface, the one or more bookmarks corresponding to at least one link to any location within the computer system;
   a bookmark selection module comprising one or more selection portions, the selection portion enabling the user to select one or more bookmarks corresponding to one or more programs and one or more views with in the programs, wherein the bookmarks are presented in the graphical user interface; and
   a bookmark execution module that responds to the bookmark selection module to resolve the link and present information to which the link refers, wherein the link is capable of referring to a Uniform Resource Locator and is also capable of referring to other location identifying information within the computer system.

2. The system of claim 1 further comprising a bookmark database containing entries for each bookmark on the system, each entry containing an identification of the bookmark and the link associated with that bookmark.

3. The system of claim 1 further comprising a bookmark creation module that enables a user to create a bookmark button to any location within the computer system;
   wherein the bookmark presentation module is responsive to present the bookmark button that has been created.

4. The system of claim 1 wherein the one or more bookmarks correspond to locations on a hard drive of a user's computer.

5. The system of claim 1 wherein the one or more bookmarks correspond to locations on the Internet.

6. The system of claim 1 wherein the one or more bookmarks correspond to locations on an intranet server to which a user's terminal is attached.

7. A method for enabling a user to navigate within a computer system through the use of bookmarks comprising the steps of:
   presenting one or more bookmarks in a graphical user interface, the one or more bookmarks corresponding to at least one link to any location within the computer system;
   enabling the user to select one or more bookmarks corresponding to one or more programs and one or more views with in the programs, wherein the bookmarks are presented in the graphical user interface; and responding to the bookmark selection means to resolve the link and present information to which the link refers, wherein the link is capable of referring to a Uniform Resource Locator and is also capable of referring other location identifying information within the computer system.

8. The method of claim 7 further comprising the step of storing entries for each bookmark on the system, each entry containing an identification of the bookmark and the link associated with that bookmark.

9. The method of claim 7 further comprising the step of enabling the user to create a bookmark button to a location within the computer system;
   responding to the bookmark creation means for presenting the bookmark button that has been created.

10. The method of claim 7 wherein the one or more bookmarks correspond to locations on a hard drive of the user's computer.

11. The method of claim 7 wherein the one or more bookmarks correspond to locations on the Internet.

12. The method of claim 7 wherein the one or more bookmarks correspond to locations on an intranet server to which a user's terminal is attached.

13. A system for enabling a user to navigate within a computer system through the use of bookmarks comprising:
   bookmark presentation means for presenting one or more bookmarks in a graphical user interface, the one or more bookmarks corresponding to at least one link to any location within the computer system;
   a bookmark selection means comprising one or more selection portions, the selection portion enabling the user to select one or more bookmarks corresponding to one or more programs and one or more views with in the programs, wherein the bookmarks are presented in the graphical user interface; and
   bookmark execution means for responding to the bookmark selection means to resolve the link and present information to which the link refers, wherein the link is capable of referring to a Uniform Resource Locator and is also capable of referring to other location identifying information within the computer system.

14. The system of claim 13 further comprising bookmark database means for containing entries for each bookmark on the system, each entry containing an identification of the bookmark and the link associated with that bookmark.

15. The system of claim 13 further comprising bookmark creation means for enabling the user to create a bookmark button to any location within the computer system;
   wherein the bookmark presentation means responds to the bookmark creation means for presenting the bookmark button that has been created.

16. The system of claim 13 wherein the one or more bookmarks correspond to locations on a hard drive of the user's computer.

17. The system of claim 13 wherein the one or more bookmarks correspond to locations on the Internet.

18. The system of claim 13 wherein the one or more bookmarks correspond to locations on an intranet server to which a user's terminal is attached.

19. A processor readable medium having processor readable code embodied therein for enabling a user to navigate within a computer system comprising:
   processor readable code for causing a processor to present one or more bookmarks in a graphical user interface, the one or more bookmarks corresponding to at least one link to any location within the computer system;

processor readable code for causing a processor to enable the user to select one or more bookmarks corresponding to one or more programs and one or more views with in the programs, wherein the bookmarks are presented in the graphical user interface; and processor readable code for causing a processor to respond to the bookmark selection means to present information to which the link refers, wherein the link is capable of referring to a Uniform Resource Locator and is also capable of referring to other location identifying information within the computer system.

20. The medium of claim 19 further comprising processor readable code means for causing a processor to store entries for each bookmark on the system, each entry containing an identification of the bookmark and the link associated with that bookmark.

21. The medium of claim 19 further comprising:

processor readable code for causing a processor to enable the user to create a bookmark to a location within the computer system;

processor readable code for causing a processor to respond to the bookmark creation means for resolving the link and presenting information to which the link refers, wherein the link is capable of referring to a Uniform Resource Locator and is also capable of referring to other location identifying information within the computer system.

22. The medium of claim 19 wherein the one or more bookmarks correspond to locations on a hard drive of the user's computer.

23. The medium of claim 19 wherein the one or more bookmarks correspond to locations on the Internet.

24. The medium of claim 19 wherein the one or more bookmarks correspond to locations on an intranet server to which a user's terminal is attached.

25. A system for enabling a user to navigate within a computer system through the use of bookmarks comprising:

a bookmark presentation module that presents one or more bookmarks in a graphical user interface, the one or more bookmarks corresponding to links to any file, page, view, portion of a file, portion of a page, portion of a view, program or action available within the computer system;

a bookmark selection module comprising one or more selection portions, the selection portion enabling the user to select one or more bookmarks corresponding to one or more programs and one or more views with in the programs, wherein the bookmarks are presented in the graphical user interface; and bookmark execution module for responding to the bookmark selection module to resolve the link and present information to which the link refers, wherein the link is capable of referring to a Uniform Resource Locator and is also capable of referring to other location identifying information within the computer system.

26. The system of claim 25 wherein the file, page, view, portion of a file, portion of a page, portion of a view, program or action available within the computer system are located on a hard drive of the user's computer.

27. The system of claim 25 wherein the file, page, view, portion of a file, portion of a page, portion of a view, program or action available within the computer system are located on the Internet.

28. The system of claim 25 wherein the file, page, view, portion of a file, portion of a page, portion of a view, program or action available within the computer system are located on an intranet server to which a user's terminal is attached.

29. A method of navigating among application programs on a system comprising:

from a first application program, providing a bookmark to a user, said bookmark including a reference to a second application program and an object within the second application program;

in response to the user selecting the bookmark, invoking the second application program; and presenting the user with the object within the second application program.

30. A method of navigating among application programs on a system comprising:

presenting one or more bookmarks to a user, wherein at least one bookmark corresponds to a reference to at least one object accessed within an application program;

upon the user selecting the at least one bookmark, invoking the application program; and presenting the at least one object to the user.

\* \* \* \* \*